May 2, 1967

JAMES E. WEBB 3,316,752
ADMINISTRATOR OF THE NATIONAL AERONAUTICS
AND SPACE ADMINISTRATION
METHOD AND APPARATUS FOR DETECTION AND LOCATION OF MICROLEAKS

Filed Dec. 31, 1964

INVENTOR.
NORMAN M. MITCHELL

BY

ATTORNEYS

INVENTOR.
NORMAN M. MITCHELL

May 2, 1967

JAMES E. WEBB
ADMINISTRATOR OF THE NATIONAL AERONAUTICS
AND SPACE ADMINISTRATION
METHOD AND APPARATUS FOR DETECTION AND LOCATION OF MICROLEAKS

Filed Dec. 31, 1964

INVENTOR.
NORMAN M. MITCHELL

BY
ATTORNEYS

United States Patent Office 3,316,752
Patented May 2, 1967

3,316,752
METHOD AND APPARATUS FOR DETECTION AND LOCATION OF MICROLEAKS
James E. Webb, Administrator of the National Aeronautics and Space Administration with respect to an invention of Norman M. Mitchell, Lomita, Calif.
Filed Dec. 31, 1964, Ser. No. 422,869
18 Claims. (Cl. 73—40.5)

ABSTRACT OF THE DISCLOSURE

A leak detecting device is mounted on the weld seam of the propellant tank of a rocket launch vehicle. The leak detecting device is basically an electrical capacitor composed of a printed electrical conductor mounted upon an impermeable dielectric tape that is adhesively secured over the weld seam. A leak in the weld seam will result in fluid escaping into an area under the tape causing it to tear or stretch so as to rupture the electrical conductor and cause a change in the capacitance between the electrical conductor and weld seam.

---

The invention described herein was made in the performance of work under a NASA contract and is subject to the provisions of Section 305 of the National Aeronautics and Space Act of 1958, Public Law 85–568 (72 Stat. 435; 42 U.S.C. 4257).

This invention relates to a method and apparatus for detecting leaks of fluids or gases from a supposedly gas impervious surface. More particularly, the invention relates to a method and apparatus for detecting and locating microleaks existing in storage receptacles, especially those holding highly explosive or dangerous fluids and whose surfaces are normally inaccessible due to their being coated, insulated or located in closely confined compartments.

The detection and location of microleaks in storage vessels, pipe lines, reaction chambers, and associated systems is often an essential standby prerequisite as assurance against release of hazardous material. During system operations leak monitoring may be warranted on a periodic or continuous basis for the same purpose as well as an indicator of impending structure failure. However the problems of detecting such small leaks are many, generally depending upon vicissitudes of the system, and can be compounded by lack of accessibility, extremes in temperature, weight and volume restrictions on the detector itself, and response rate requirements.

A not untypical example is the testing and monitoring of the liquid hydrogen tank of the Saturn S–II booster in which the principal suspect area for leaks is the several thousand feet of welds found on the tank. The sidewall welds are normally covered with insulation while the dome or bulkhead welds are difficult or impossible to reach. Access to the tank interior for purposes of testing the seams is prohibited due to cleanliness requirements. While filled with liquid hydrogen, prudence forbits manual probing at close proximity to the tank when a leak is suspected or known to exist. Leak monitoring (in the hundredths of cc. per second range) of the tank is, however, esssential from several safety aspects in addition to its potential role as an indicator of incipient structural flaws. If a leak is noted, then obviously its location must be accurately ascertained to permit repair. Since some leaks will only be indicated under the stresses induced at the extremely low liquid hydrogen temperature (minus 423 F.), the problem of location is exceedingly complex and difficult.

All prior methods of leak detection involve the passage of a "tracer" fluid from one side of the presumed leak to the other, and the subsequent detection of the fluid on the latter side. Exhaustive investigation of existing instrumental techniques vs. the Saturn S–II liquid hydrogen tank leak detection requirements and restrictions resulted in the basic selection of mass spectrometers as the indicator to be used, with helium gas as the pre-filled tracer and liquid hydrogen as the post-filled prelaunch tracer. To detect the tracer using this mass spectrometer technique, a carrier gas (hydrogen in the case of helium tracer, helium for the hydrogen tracer) is first channeled directly over the welds and piped to the remotely located indicator(s). As is well known, the precision of leak detection using this technique is primarily dependent upon the length of each of the separate channels. If the leak is by chance detectable under ambient temperatures, more precise location is possible by noting instrument response times at several taps along the length of the channel.

The mass spectrometer system is admirably qualified for the detection task on the basis of sensitivity and response time, although a minor weight penalty (perhaps a hundred pounds for channels, fittings and linings, if used on the Saturn S–II) is involved. As a leak locater, however, this system is woefully inadequate unless access to the interior of the tank is permitted and, of course, leakage is evident under ambient conditions. In this case, pressurized helium in the channel could be pin pointed on the interior tank wall by manual probing. However, as noted above, such probing and interior inspecting of fuel tanks of the type used on lauch vehicles is neither safe nor practical and, therefore, cannot be permitted.

Various other methods and types of leak detecting devices have also been suggested and tested, but were found to be unacceptable for one or more reasons. For example, leak detecting devices of the type in which the resistance of a conductive element is changed by the fluid leaking through a flaw or rupture in the container wall cannot be used since the electrical current flowing therethrough could ignite the fuel within the container with the result being a catastrophic explosion. Furthermore, such a system does not permit the precise location of the leak without further testing being performed. The use of a latex coating or the like over the weld or container surface, which will capture the escaping fluid thus forming a bubble or globule, is also unacceptable since such a coating is generally undesirable on liquid containers, especially those holding cryogenic fluids, and even if used would require a visual inspection which cannot be performed in most instances.

According to the present invention it has been found that a novel leak detection system can be produced which is readily adapted for use in detecting and locating leaks in various types of containers to a degree heretofore unattainable. This new method and system is inherently capable of continuously detecting and precisely locating inaccessible leaks down to 0.001 cc. per second under virtually any temperature conditions. Utilizing the materials employed in the hereinbelow described specimen, operations from −450 to +450 F. are practical and the weight thereof, if added to a flight vehicle, is negligible. In fact, as applied to the approximately 5000 feet of weldments on the propellant tanks of the Saturn S–II, the weight of the total airborn portion of the system is less than 25 pounds. From a cost standpoint the indicating apparatus costs only a small fraction of the current mass spectrometer system heretofore used while rendering far superior overall test results.

Accordingly, it is an object of this invention to provide a safe, convenient, and accurate method and system for detecting leaks in liquid or gas containers, especially fuel systems.

Another object of this invention is to provide a method and apparatus for detecting leaks through apertures or like discontinuities existing through the walls of the elements or device being tested, which method and apparatus will be sensitive to extremely minute leaks.

Yet another object is to provide a non-hazardous method for detecting leaks in launch vehicles, propellant tanks, and propellant injection systems.

A further object of this invention is to provide a method and apparatus for detecting leaks which is more convenient, quicker, and consequently less expensive to manufacture and use than the prior art methods and apparatus.

It is a still further object of this invention to eliminate the use of an expensive apparatus and large quantities of testing fluids to detect leaks.

Yet another object of this invention is to provide a method and apparatus for not only detecting microleaks, but for rapidly and accurately locating such leaks.

Yet still another object of this invention is to provide a method and apparatus for detecting and locating microleaks on flight borne vehicles.

These and other objects and advantages of this invention will be more apparent upon reference to the following specification, appended claims and drawings wherein:

In order to better understand the construction and use of this novel method and apparatus for detecting and locating microleaks, it will be described in connection with a propellant system of a large launch vehicle for which use it was particularly conceived. It is to be understood, however, that various other uses may be found for this novel microleak detection and locating method and apparatus. For example, such a method and apparatus constructed in accordance with this invention will give superior results when used in the chemical process industry, steam generators, water mains, etc. In all cases, the working fluid of the system being tested or monitored acts as the tracer with no addition of contaminants being required.

Figure 1:
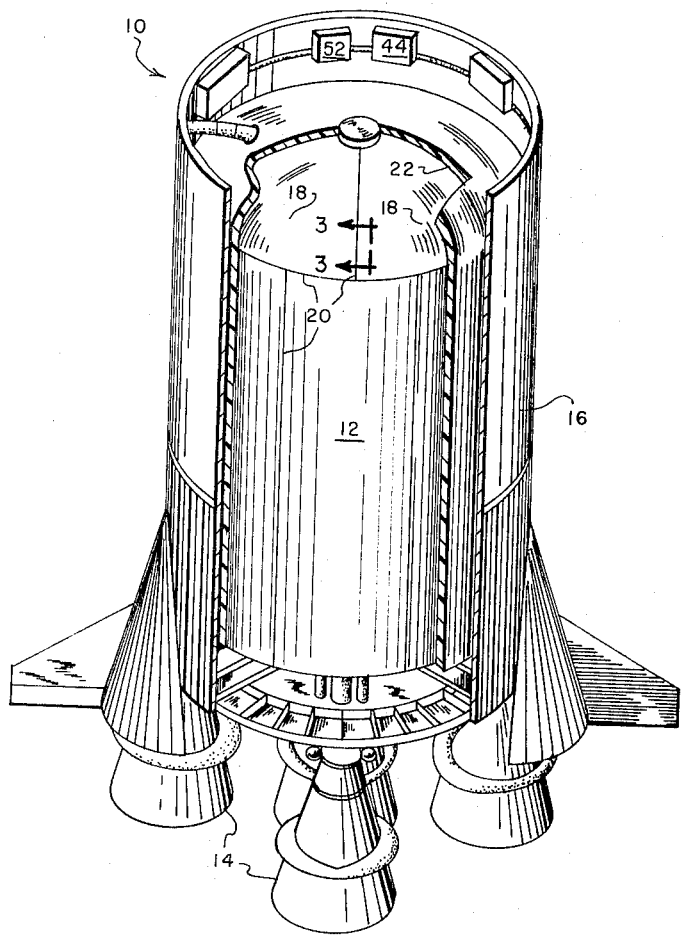
FIGURE 1 is a side view of a launch vehicle with portions thereof broken away to show the leak detection and location apparatus installed in operating position over the weld seams of the propellant container.

With continued reference to the accompanying figures wherein like numerals designate similar parts throughout the various views, and with initial attention directed to FIGURE 1, reference numeral 10 is used to generally designate a launch vehicle of a Saturn class. As is the general practice in the launch vehicle field, a fuel tank 12 is located just above the rocket engines 14 and for aerodynamic purposes is surrounded by a thin outer skin 16. This tank 10 is adapted to not only carry a portion of the fuel used during the flight of the vehicle, but also to act as the load bearing structure prior to and during flight. Since these tanks are usually extremely large (in excess of 30 feet in diameter and 70 feet in length for Saturn V type vehicles), it is normally fabricated from a plurality of separately formed plates 18 which are butted together and welded at 20 along their edges. These weldments 20 must be as near perfect as is obtainable under the state of the welding art since they must not only be leak free under non-loaded conditions, but must not open or crack when subjected to the forces encountered under loaded and flight conditions.

In order to check the perfection of the weldments 20 they are X-rayed along with the taking of other testing steps as they are assembled. These tests are generally quite accurate and will detect most weak points in the weldments. However, since the tank will undergo rather severe strains after this initial assemblying and testing which could cause an opening in the weldments to occur, it is necessary that the tanks be subjected to continuous testing. Ideally this testing of the tanks should continue not only through the ground loading, testing and firing of the launch vehicle, but also throughout the flight of the vehicle as well.

Such prolonged and continuous testing using prior known methods and apparatus has proven to be extremely difficult, costly, time consuming and somewhat unreliable. This is especially true where the tank must be coated with an insulative layer, such as shown at 22 in FIGURE 1, before the tank is filled or otherwise subjected to actual use. With such a layer over the exterior of the tank, the weldments 20 are no longer easily accessible. This is also true where the weldments are inaccessible because there is little or no space existing between the outer walls of the tank and the compartment in which it is housed.

As noted hereinabove, due to the inaccessibility of the weldments 20 of the tank 12 for inspection for leakage after the launch vehicle 10 is assembled, it is desirable to provide a leak-detecting and locating system that will indicate at a convenient remotely located point any leakage that is occurring. Such a leak detecting and locating system constructed in accordance with one embodiment of this invention is illustrated in FIGURES 2–5. The composite unit in this system is generally indicated at 24 and is basically an electrical capacitor comprised of a printed electrical conductor 26 mounted upon an impermeable dielectric tape 28 that is adhesively bonded by an adhesive layer 30 over the weld seam 20 formed between two plates 32 and 34 of the tank. The term "printed" as used in this invention is meant to include the forming of electrical conductors by such processes as silk screen, electrolysis plating, vacuum deposition, plasma spray, etc.

For purposes of protecting the printed conductor from the elements and mechanical abuse, an overlay 36 is bonded by an adhesive layer 38 over the printed conductor 26. This overlay may have a grounded conductive film 39 coated or otherwise secured thereon and electrically connected by suitable means (not shown) to the weld seam 20 to increase the sensitivity of the system by doubling the effective capacitor plate area. This conductive coating also serves to provide shielding of the capacitor from stray electromagnetic fields. Preferably the overlay 36 and its coating 39 are split at 40 for permitting the easy escape of any gases trapped under the overlay.

The physical characteristics of the adhesive 30 is such that the peel strength thereof exceeds the tear and/or stretch resistance of the dielectric 28; the continuous printed electrical conductor 26 simultaneously having relatively low strength and elongation. The adhesive once placed over the weld seam 20, and upon the adjacent edges of the plates 32–34, forms a gas tight seal thereover with the only avenue of egress available to the escaping gases coming from the seam being through the adhesive and thus the dielectric layer 28. The adhesive 38 is, preferably, also such that the peel strength thereof exceeds the tear and/or stretch resistance of the overlay 36.

If desired, the composite system 24 can be fabricated as a single unit for application over a weld or it can be laminated thereupon a single layer at a time. By way of example, it has been found that the composite 24 can be constructed of the following materials:

Dielectric 28 _____ 0.002″ × 0.5″ unsintered polytetrafluoroethylene.
Printed conductor 26 __ colloidal silver in silicone resin base.
Adhesives 30–38 _____ silicone rubber base.
Overlays 36 and 39 ____ vacuum deposited on 0.005 inch polyethylene t e r e p h thalate with silicone rubber adhesive slit into one quarter inch wide strips.

A composite constructed of these materials has been found to give almost instantaneous results in detecting and locating leaks of approximately 0.01 cc. per second through an aluminum plate pressurized at 5 p.s.i.g. Obviously the overlays 36 and 39, and adhesive layer 38, can be omitted if such is not necessary or desirable. Similarly either or both of the adhesive layers can be omitted if the dielectric 28 and/or the overlay 36 are applied as coatings instead of films.

Figure 2:
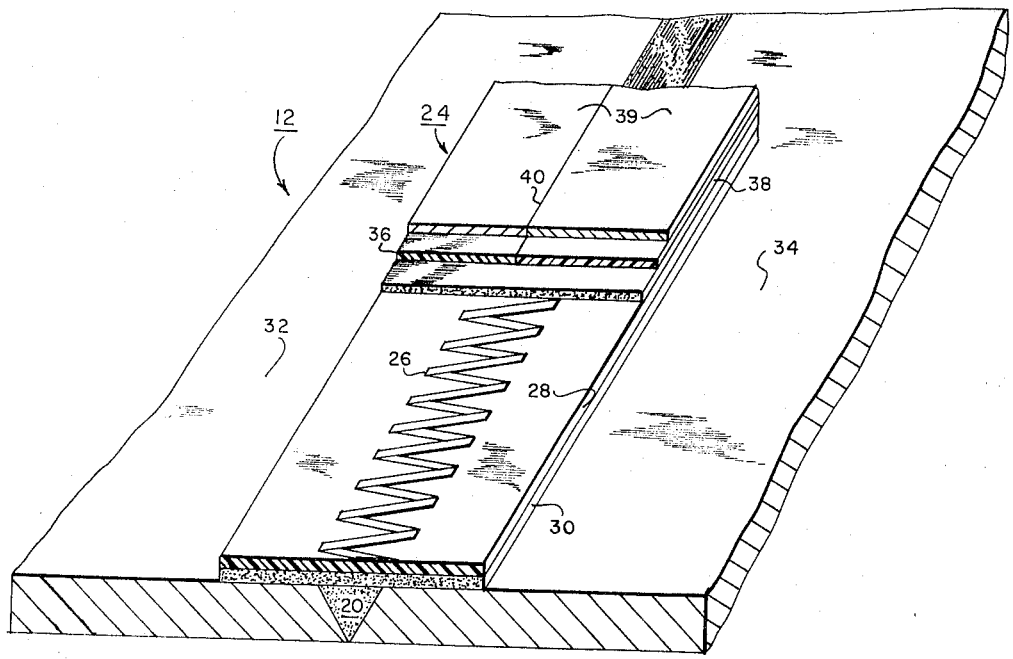
FIGURE 2 is a perspective view of the capacitance tape sensing element employed in FIGURE 1.

For purposes of illustrating the function and operation of the leak-detecting and locating system, it will be assumed that a composite such as shown in FIGURE 2 is placed over each weld 20 of the tank 12 of FIGURE 1 prior to the application of the insulating layer 22 thereto. The composite 24, when so applied, will have a known capacitance per foot of length which is established between the two plates of the capacitor. The printed conductor 26 forms one plate of the capacitor whereas the other plate is formed by the weld metal 20, the adjacent metal plates 32 and 34, and the grounded conductive film 39. Preferably, the printed electrical conductor 26 is of a zig-zag configuration to give a suitable capacitance value per foot of length, but clearly other patterns could be used.

Figure 3:
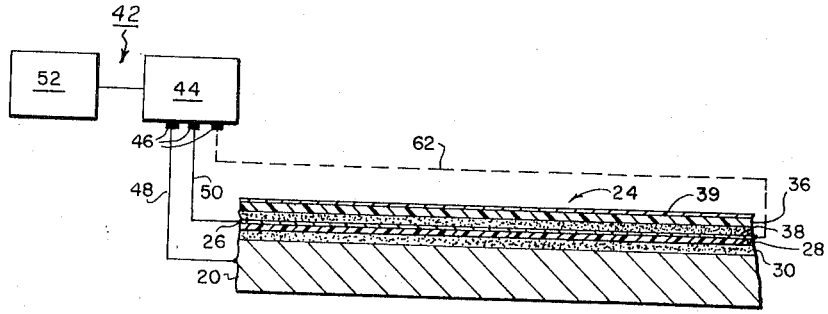
FIGURE 3 is a cross-sectional view, partially in schematic form, taken along line 3—3 of FIGURE 1 illustrating the capacitance tape sensing element in operation.

FIGURE 3 illustrates one way in which the composite 24 is electrically connected to a readout circuit for indicating both when a leak has occurred in a weldment and the location of the leak. The readout circuit is generally indicated at 42 and is comprised of a capacitance sensing unit 44 of any suitable type which will detect and produce an output whenever a change in capacitance appears at the input terminals 46 of the unit. These input terminals 46 are connected through suitable electrical lead-in conductors 48 and 50 to the weld seam 20 and printed conductor 26, respectively. A recorder or other suitable type output circuit 52 is electrically or telemetrically connected to the readout circuit 44 for recording the output of the circuit. With the composite 24 thus connected to the input of the readout circuit 42, the leak detecting and locating system is ready for operation. Since the total weight of the readout circuit 42 is very light it can easily be carried on the vehicle as shown in FIGURE 1 for continuous operation during the flight.

Figure 4:
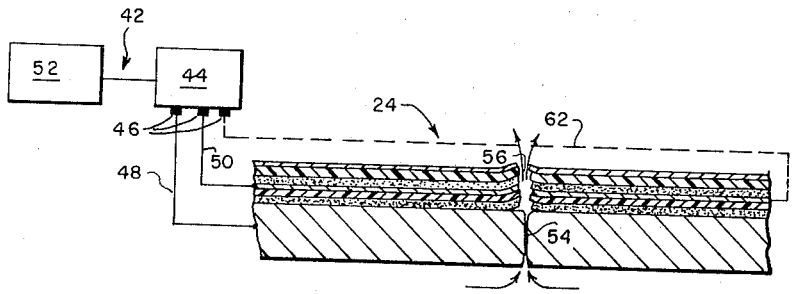
FIGURE 4 illustrates the capacitance tape sensing element of FIGURE 3 after a rupture in the weld seam has occurred.

Since the tank 12 of the vehicle 10 is normally pressurized, a leak in the weldment 20, as pictorially shown at 54 in FIGURE 4, will result in fluid escaping into an area under the composite 24 that is located immediately above the leak. This escaping fluid will have sufficient pressure to cause a dielectric 28 to tear and/or stretch which, in turn, causes the printed conductor 26 carried thereon to rupture. Thus an instantaneous indication of the leak is provided by the loss of continuance of the conductor and the resultant change in capacitance caused thereby. For purposes of illustration the composite 24 is shown torn completely in half at 56. Since the capacitance recorded on the circuit 52 is directly proportional to the plate area of the composite 24, a precise determination of the leak location is readily made from comparing the before and after capacitance readings obtained on the readout unit 52.

Figure 5:
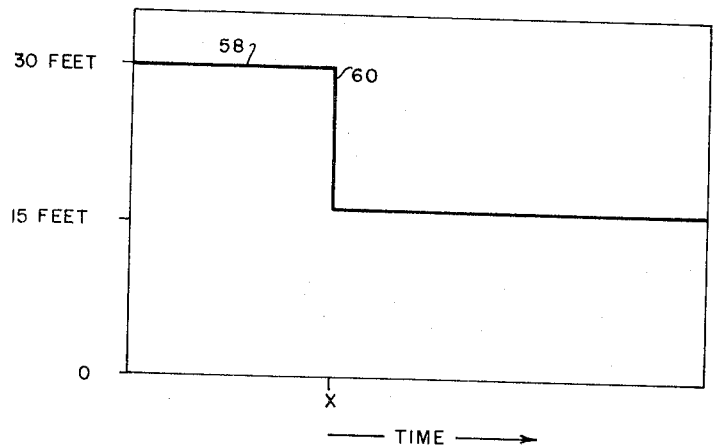
FIGURE 5 is a graphic representation of the output obtained from the readout unit of the microleak detection and locating system of this invention.

FIGURE 5 illustrates a typical graphic readout obtained from the readout circuit 52. In this instance it is assumed that the length of the seam under test in FIGURES 3 and 4 is 30 feet, that the leak occurred 16 feet from the left end thereof, and at a point $x$ in time. As seen on the graph, as long as the printed conductor 26 is continuous the capacitance presented to the terminals 46 of the readout circuit 42 will be such as to produce a trace 58 on the graph that indicates the complete 30 feet of conductor is intact. Once the leak in the weld occurs (which is at point $x$ in time for purposes of illustration), the conductor 26 will be ruptured and the trace 58 on the graph will drop sharply, as shown at 60, until the new value of capacitance presented to the terminals 46 is indicated. Thus since the capacitance presented to the terminal 46 is directly proportional to the plate area connected to the terminals, and this area is reduced whenever the printed conductor 26 is ruptured, a precise determination of the leak location is readily obtained. With the leak now located, appropriate steps to correct the leak can be taken with a minimum of trouble and effort.

Under certain circumstances it may be desirable to connect several other points on the printed conductor 26 to the readout circuit 42. This can easily be done as shown by the broken line 62 in FIGURES 3 and 4. By so doing, the readout circuit will now simultaneously detect any of a plurality of leaks occurring along the seam. Lead 62 need not be permanently installed and may, if necessary or desirable, terminate in a probe which can be manually inserted through the overlays 36–39 into engagement with the conductor 26.

Figure 6:
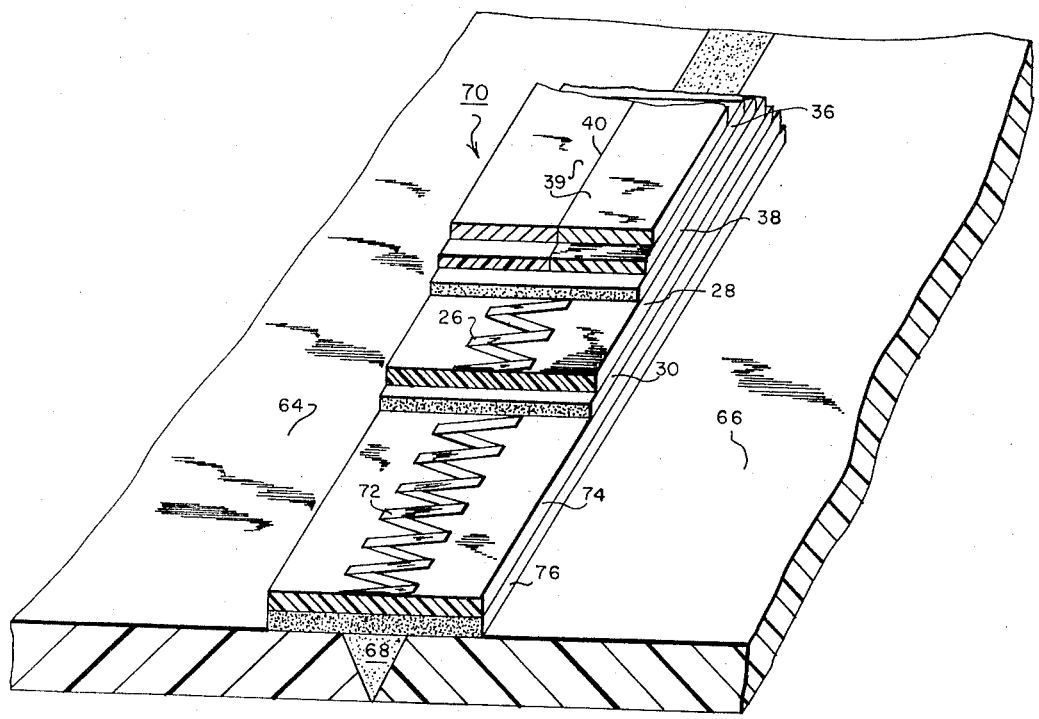
FIGURE 6 is a prospective view of a second type of capacitance tape sensing element that is especially designed for use on containers formed from or coated with insulative type materials.

The present invention as shown in FIGURE 2 is suitable for testing non-conducting seams by using the conductive coating 39 as the sole second plate of the capacitor. However, FIGURE 6 illustrates the adaptation of the present invention for use on testing non-conducting seams wherein the benefits of a duel second capacitor plate are provided. The plates or panels 64–66 between the adjacent edges of which a non-conducting seam 68 is formed has a composite 70 placed thereover. This composite 70 is somewhat similar to the composite 24 shown in FIGURES 2–4 except that a second printed electrical conductor 72, mounted on an impermeable dielectric tape 74, has been first bonded by adhesive layer 76 over the seam 68. Thus the second printed conductor 72 takes the place of the weld seam 20 and the metal plates 32 and 34. This type of leak-detecting and locating system has been found especially well adapted for use in testing and/or monitoring plastic vessels, flanges, etc.

Clearly, the elements 72, 74 and 76 are not limited to the form shown in FIGURE 6. Other forms such as a slit, metal backed, adhesive tape would also be suitable. Furthermore, the first conductive element 72 could be printed directly upon the container if such were desirable.

From the foregoing it is readily apparent that a vastly superior leak-detecting and locating system has been described. Not only is it now possible to detect very minute leaks of a gas or fluid from a container, but such leaks are instantaneously and accurately located. Furthermore, no visual inspection or probing of the seam is necessary, nor need any current be carried by the seam which might spark a catastrophic disaster.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by the United States Letters Patent is:

1. A method of testing metal containers to indicate leakage of the container's contents which consists of the following steps:

(a) covering that part of said continer which is to be tested for leakage with an insulative material;

(b) permitting said insulative material to cure to form a homogeneous sheet which adheres to said container at its interface for confining said contents of said container opposite a leak until said sheet is deformed by the pressure of said contents;

(c) placing at least one easily ruptured electrically conductive strip on said insulative sheet thereby forming an electrical capacitor with said metal container serving as the first plate thereof and said electrically conductive strip serving as the second plate thereof; and (d) connecting a capacitor detector and readout circuit between said first and second plates of said capacitor which is responsive to the change in the capacitance of said capacitor produced when said conductive strip is ruptured by the deformation of said sheet caused by the leakage of said container contents.

2. A method of testing metal containers to indicate leakage of the container's contents which consists of the following steps:

(a) covering that part of said container which is to be tested for leakage with a layer of adhesive material;

(b) placing a sheet of insulative material over said layer of adhesive material;

(c) permitting said layer of adhesive material to cure thereby bonding said sheet to the surface of said container in an air tight manner so that any leakage of the contents of said container will be trapped under said sheet thereby causing said sheet to be deformed;

(d) placing at least one easily ruptured electrically conductive strip on said sheet thereby forming an electrical capacitor with said metal container serving as the first plate thereof and said electrically conductive strip serving as the second plate thereof;

(e) placing a metallic shield over said capacitor for protecting said capacitor from stray electro-magnetic fields and increasing the sensitivity of said capacitor; and (f) connecting a capacitor detector and readout circuit between said first and second plates of said capacitor which is responsive to the change in the capacitance of said capacitor produced when said conductive strip is ruptured by the deformation of said sheet caused by the leakage of said container contents.

3. A method of testing containers to indicate leakage of the container's contents which consists of the following steps:

(a) covering that part of said container which is to be tested for leakage with an insulative material;

(b) permitting said insulative material to cure to form a homogeneous sheet which adheres to said container at its interface for confining said contents of said container opposite a leak until said sheet is deformed by the pressure of said contents;

(c) placing a first electrically conductive material over said insulative sheet;

(d) placing a second insulated electrically conductive material in spaced relationship over at least a part of said first electrically conductive material to form a capacitor, at least one of said electrically conductive materials being of the type that is easily ruptured by the deformation of said sheet; and (e) connecting a capacitor detector and readout circuit between said first and second electrically conductive materials which is responsive to the change in the capacitance of said capacitor produced when at least one of said conductive materials is ruptured by the deformation of said sheet.

4. A method of testing metal containers to indicate leakage of the container's contents which consists of the following steps:

(a) covering that part of said container which is to be tested for leakage with a layer of adhesive material;

(b) placing a sheet of homogeneous insulative material over said layer of adhesive material;

(c) permitting said layer of adhesive material to cure thereby bonding said sheet to the surface of said container in an air tight manner so that any leakage of the contents of said container will be trapped under said sheet thereby causing said sheet to be deformed;

(d) coating at least one adhering, easily ruptured electrically conductive strip on said sheet thereby forming an electrical capacitor with said metal container serving as the first plate thereof and said electrically conductive strip serving as the second plate thereof;

(e) placing an adhering insulative strip over said capacitor;

(f) placing an adhering metallic shield over said capacitor and electrically connecting said shield to said metal container for protecting said capacitor from stray electromagnetic field and increasing the sensitivity of said capacitor;

(g) connecting a capacitor detector and readout circuit between said first and second plates of said capacitor which is responsive to the change in the capacitance of said capacitor produced when said conductive strip is ruptured by the deformation of said sheet caused by the leakage of said container contents.

5. In the combination of a container and a leak detecting and locating apparatus which is positioned in such a manner as to detect any leakage of the contents of the container, an improved leak detecting and locating apparatus including:

a. sensing means comprising,
 (1) a sheet of homogeneous material covering that part of said container which is to be monitored for leaks,
  said sheet being held in a fluid tight manner against the surface of said container for confining said contents of said container opposite a leak until said sheet is deformed by the pressure of said contents;
 (2) at least a first and second electrically conductive surface means,
  (a) at least one of said first and second electrically conductive surface means being placed on said sheet and of the type that is readily ruptured by the deformation of said sheet,
  (b) said first and second conductive surface means being insulated from one another;

b. at least a first and second electrical terminal means,
 said first terminal means being electrically connected to said first conductive surface means and said second terminal means being electrically connected to said second conductive surface means thereby forming a capacitor with said first conductive surface means forming one plate thereof and said second conductive surface means forming the other plate thereof; and c. detector and readout means connected across said first and second electrical terminal means,
 said detector and readout means being adapted to indicate the change in capacitance produced when said conductive surface means is ruptured as said sheet is deformed by the leakage of said container contents thereby indicating both the occurrence of the leak and its location.

6. In the combination of a metal container and a leak detecting and locating apparatus which is positioned in such a manner as to detect any leakage of the contents of the container, an improved leak detecting and locating apparatus including:

a. sensing means comprising,
 (1) an insulative sheet covering and held in contact with the surface of that part of said container which is to be monitored for leaks thereby confining said contents of said container opposite the leak until said sheet is deformed by the pressure exerted by said contents,
  (2) at least one easily ruptured electrically conductive strip placed on said sheet and secured thereto so that said conductive strip is ruptured when said sheet is deformed;
b. at least a first and second electrical terminal,
  said first terminal being electrically connected to said metal container and said second terminal being connected to said conductive strip thereby forming a capacitor with said metal container forming one plate thereof and said conductive strip forming the other plate thereof; and
c. detector and readout means connected across said terminals,
  said detector and readout means being adapted to indicate the change in capacitance produced when said conductive strip is ruptured as said sheet is deformed by the leakage of said container contents thereby indicating both the occurrence of the leak and its location.

7. A device for detecting and locating leakage of fluids from a container comprising:
a. an insulative sheet of material;
b. means for securing said sheet onto the surface of said container thereby forming a fluid tight enclosure for trapping any of the contents of said container that is leaking therefrom and holding the same until said sheet is deformed;
c. first electrically conductive means secured to said sheet,
  said conductive means being adapted to be ruptured by the deformation of said sheet;
d. second electrically conductive means insulated from and operatively associated with said first conductive means for forming a capacitor; and
e. indicator means connected between said first and second conductive means for indicating when and at what point a change in the capacitance of said capacitor occurs due to said first conductive means being ruptured by the deformation of said sheet as the leakage of the contents of said container is trapped.

8. A device for detecting and locating leakage of fluids according to claim 7 wherein said first conductive means is printed upon said sheet.

9. A device for detecting and locating leakage of fluids according to claim 7 wherein said container is made at least in part of metal and said second conductive means is said metal container.

10. A device for detecting and locating leakage of fluids according to claim 7 wherein said second conductive means is a printed conductor spaced over and insulated from said first conductive means.

11. A device for detecting and locating leakage of fluids according to claim 7 wherein shield means is placed over said capacitor means for protecting said capacitor from mechanical abuse and stray electromagnetic fields.

12. A device for detecting and locating leakage of fluids according to claim 11 wherein said shield means is a split overlay placed over said capacitor means for increasing the sensitivity of the device and for permitting the easy escape of any fluids trapped under said sheet.

13. A device for detecting leakage of fluids and the like confined in containers having joints where such leakage may occur, said device comprising:
a. an impermeable insulative tape having adhesive means placed on one side thereof,
  (1) said tape being placed over said joints with said adhesive pressed into engagement with said container thereby forming a sealed channel over said joints for locally confining at least momentarily any contents of said container leaking through said joints,
  (2) said tape being adapted to be deformed by the pressure exerted thereon as the contents of said container leaks through said joint and is trapped in said sealed channel;
b. first electrically conductor means printed on said tape;
c. second electrically conductor means insulated from and operatively associated with said first conductor means for forming a capacitor;
d. indicator means connected between said first and second conductor means for indicating when and at what point said first conductor is ruptured as said tape is deformed due to the leakage of the contents of said container through the joints; and
e. shield means placed over said capacitor means for protecting said capacitor from mechanical abuse and stray electromagnetic fields.

14. A device for detecting leakage of fluids and the like according to claim 13 wherein said second conductor means is mounted upon a second insulative tape and is secured over said first tape by an adhesive coating.

15. A device for detecting leakage of fluids and the like according to claim 14 wherein said second conductor means is printed upon said second tape.

16. A device for detecting leakage of fluid and the like according to claim 15 wherein at least one of said printed conductor means is printed in a substantially zig-zag configuration for increasing the capacitance of said capacitor per unit length.

17. A device for detecting leakage of fluids and the like according to claim 16 wherein said shield means consists of a metal coating carried on a third insulative tape which is secured over said capacitor means by an adhesive coating.

18. A device for detecting leakage of fluids and the like according to claim 17 wherein said shield means is split along its length into at least two elongated strips for permitting said impermeable tape to be easily deformed.

References Cited by the Examiner

UNITED STATES PATENTS 2,964,587   12/1960   Minot.

LOUIS R. PRINCE, *Primary Examiner.*

J. NOLTON, *Assistant Examiner.*